Feb. 24, 1931.   A. H. DE ROCHER   1,793,545
LOADING AND TRANSPORTING DEVICE
Filed May 13, 1930   2 Sheets-Sheet 1

INVENTOR
Arthur Hanna DeRocher
by Cameron, Kerkam & Sutton
ATTORNEYS.

Feb. 24, 1931.  A. H. DE ROCHER  1,793,545
LOADING AND TRANSPORTING DEVICE
Filed May 13, 1930  2 Sheets-Sheet 2
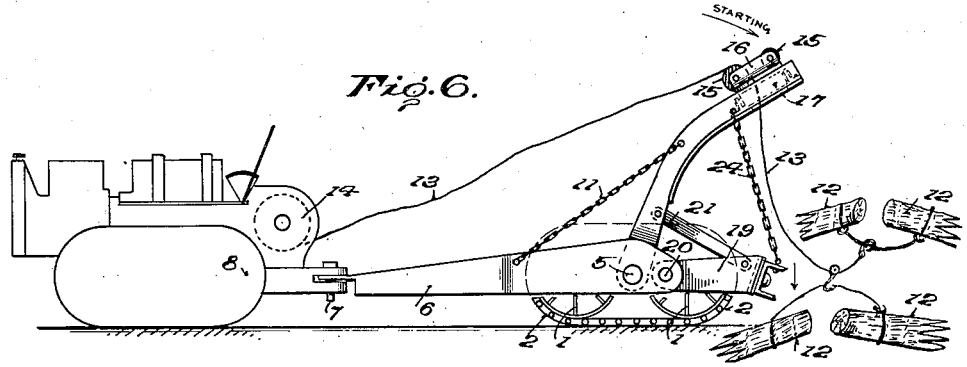
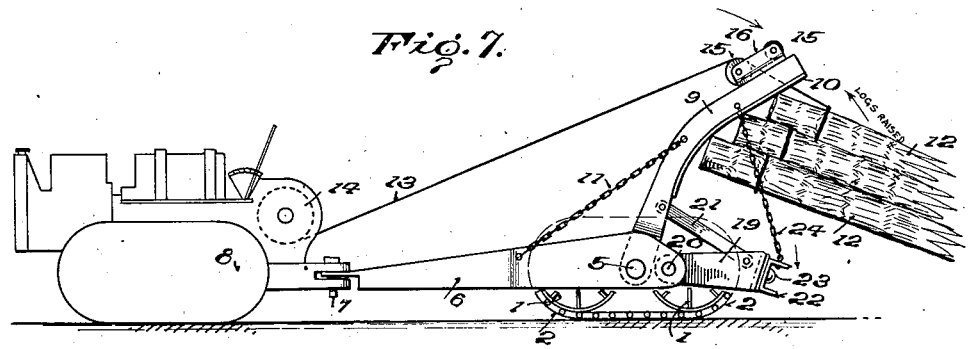
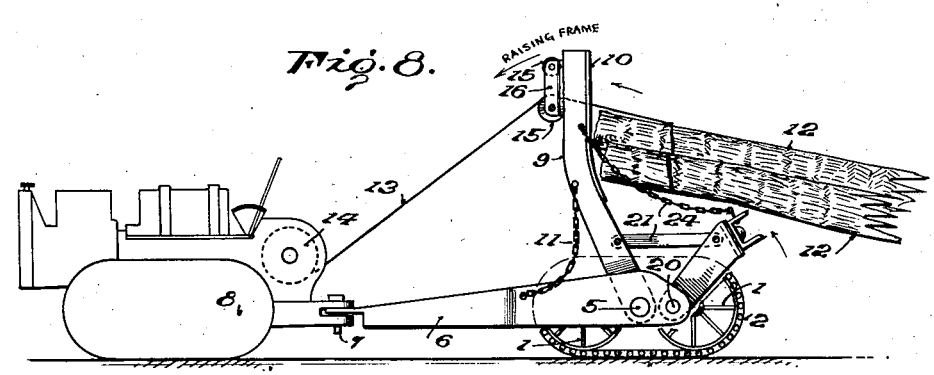
INVENTOR
Arthur Hanna DeRocher
BY
Cameron, Kirkland & Sutton.
ATTORNEYS Patented Feb. 24, 1931

1,793,545

UNITED STATES PATENT OFFICE

ARTHUR HANNA DE ROCHER, OF SEATTLE, WASHINGTON

LOADING AND TRANSPORTING DEVICE

Application filed May 13, 1930. Serial No. 452,059.

This invention relates to apparatus for loading, transporting, and unloading heavy objects, particularly logs and the like, and has for its object to provide novel and improved apparatus of this kind whereby logs or the like may be easily and quickly lifted and their ends placed on a suitable support on which they rest by their own weight while being hauled or skidded, and whereby said logs or the like may be easily and quickly unloaded.

With these objects in view, the invention, generally stated, consists in a wheel-supported swinging arm or standard equipped with suitable means such as a running cable for elevating logs or the like, and a wheel-supported swinging load support, said arm or standard and said load support being suitably connected for simultaneous swinging movement about their pivots. After the logs or the like have been elevated, the arm or standard is swung about its pivot and the load support is swung simultaneously to load supporting position under the elevated logs while the latter are lowered onto said support. Preferably all of these operations are accomplished by hauling in the cable, as by means of a suitable drum.

The invention is capable of a variety of mechanical expressions, one of which, for purposes of illustration, is shown in the accompanying drawings, but it is to be expressly understood that said drawings are for purposes of illustration only and are not to be construed as defining the limits of the invention, reference being had to the appended claims for this purpose.

In said drawings—

Figs. 6, 7 and 8 show successive positions of the apparatus in loading logs or the like, parts being removed for the sake of clearness.

Figure 1:
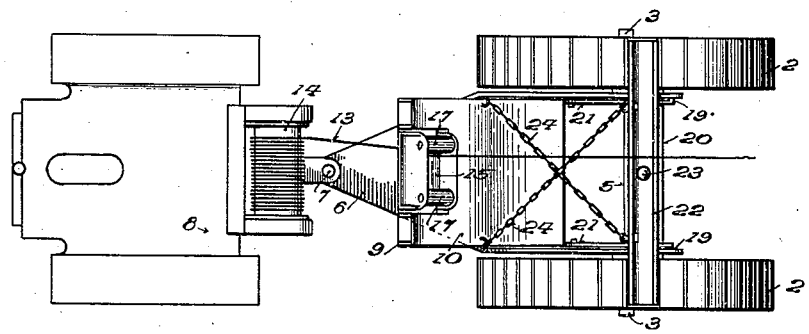
Fig. 1 is a plan view of an apparatus embodying the invention.

Apparatus embodying the invention may be mounted for transportation in any suitable manner, either on a suitable vehicle provided with a source of motive power, or on a wheeled frame which may be pulled by a tractor or any other motive power. In the drawings, wherein like reference characters indicate like parts throughout the several views, said apparatus is, by way of example, shown mounted on a supporting body or frame which may comprise ground wheels 1 preferably of the track laying type and provided with a flexible track 2, said wheels being mounted on stub axles 3 carried by frame members 4. The frame members 4 are connected by an axle 5 on which is mounted a tongue frame 6 which is suitably attached as by means of a pin 7 with any suitable tractor shown diagrammatically at 8. It is to be understood, however, that the specific form of the structure thus far described is not part of the present invention, and that any suitable structure may be employed.

Pivoted on the axle 5 is an elevating arm or standard of any suitable construction which as shown comprises two curved arms 9 preferably joined by a cover plate 10. The elevating arm or standard may be swung from the position shown in Fig. 2 where it rests on suitable stops (not shown) on the tongue frame 6 to the position shown in Fig. 6, further movement being prevented by suitable means such as a chain 11 connecting the standard with the tongue frame 6.

Figure 4:
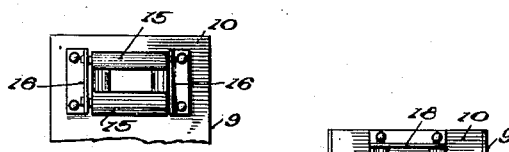
Figs. 4 and 5 show a cable fairlead viewed from opposite sides.
Figure 5:
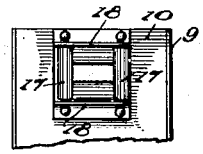
Figure 3:
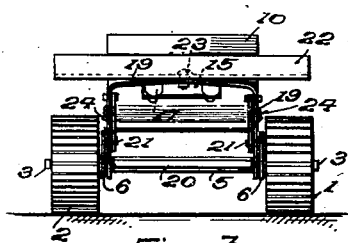
Fig. 3 is an end view of the apparatus.

The standard 9, 10 is equipped with suitable means for elevating logs or the like 12, said means preferably comprising a cable 13 passing over a running support or fairlead on the standard and preferably hauled in to lift the logs 12 by means of a suitable drum 14 which as shown is power operated and mounted on the tractor 8. As shown particularly in Figs. 4 and 5, the cable fairlead may comprise a pair of parallel rollers 15 mounted in suitable brackets 16 on the plate 10, and a pair of parallel rollers 17 mounted in suitable brackets 18 on the plate 10, the axes of rollers 16 and 17 being at right angles. The cable 13 passes through the space defined by the surfaces of the four rollers and through an opening in the plate 10.

Figure 2:
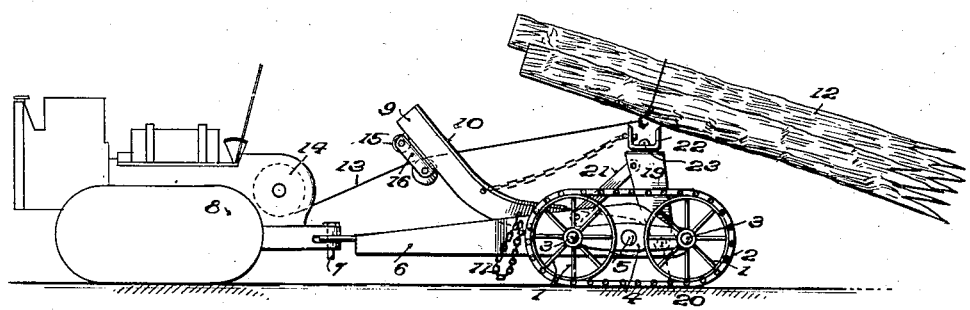
Fig. 2 is a side elevation of Fig. 1.

A swinging load support 19 is pivoted on the frame in any suitable manner and is adapted to swing from the position shown in Fig. 6 to load supporting position shown in Fig. 2, said support being preferably linked to the standard 9, 10 for simultaneous swinging movement. In the form shown, the sides of the tongue frame 6 are extended rearwardly of the axle 5 and are provided with hinge pins 20, the load support 19 being constituted by a U-shaped frame the legs of which are pivoted on the pins 20. The load support is preferably connected with the standard by means of a pair of links 21, so that as the standard swings about the axle 5, the load support 19 swings simultaneously about hinge pins 20.

Preferably a swinging bunk 22, which as shown is U-shaped in cross-section, is pivoted on load support 19 by suitable means such as a pin 23 about an axis that is substantially vertical when the load support is in the position shown in Fig. 2. As shown in this figure the ends of the logs rest on the bunk 22 which can pivot about pin 23 when the logs are transported around a curve. When the logs are being loaded, as shown in Figs. 6 and 7, the swinging bunk is preferably held in its normal transverse position by suitable means such as a pair of cross chains 24 connecting the standard 10 with the swinging bunk, these chains being slack when the support 19 is in load supporting position as shown in Fig. 2.

The operations of loading, transporting and unloading logs or the like from the apparatus above described are as follows. A suitable number of logs 12 as shown in Fig. 6 are connected in the usual or any suitable manner to the cable 13, which is hauled out manually through the fairlead, the standard and load support being in the position shown in Fig. 6. The cable is then hauled in by means of drum 14 and the logs are lifted until they come up against the standard as shown in Fig. 7. Continued strain on cable 13 will swing the standard about axle 5 as shown in Fig. 8, the load support 19 simultaneously swinging up toward load supporting position under the elevated logs. As the standard and load support continue to swing to the position shown in Fig. 2, the logs 12 are lowered to rest on the swinging bunk 22. In this position the standard and load support can be held against further swinging movement by any suitable stops, and the strain on cable 13 can be held by a suitable brake or the like so as to maintain the parts in loaded position while the tractor 8 pulls the loading apparatus and the logs. In going around a curve the bunk 22 will pivot about pin 23 so that the logs 12 may swing relative to the loading apparatus without sliding on the bunk. In unloading, the cable 13 is slacked off and the tractor 8 is set in motion to pull the loading apparatus ahead, the friction of the logs 12 on the ground rotating the standard and load support back to the position shown in Figs. 6 and 7 and dumping the logs.

It will be apparent that apparatus embodying the invention is simple, inexpensive, and strong. Logs to be transported are lifted and placed on the loading support by the single operation of hauling in the cable 13 and are held in place during transportation merely by holding the strain on the cable. The weight of the logs, however, is supported by the load support. Unloading is accomplished by merely slacking off the cable and pulling the loading apparatus ahead. The ease and simplicity of the operation will be apparent.

It will be understood that the invention is not limited to the form described and illustrated in the drawings. For example, other means for lifting the logs 12 and placing them on the loading support may be employed in place of the cable 13, the winding drum for the cable may be either manually or power operated, the loading apparatus together with the source of motive power may constitute a single vehicle or the loading apparatus may be constructed as a tractor attachment, etc. Changes may also be made in the details of construction and arrangement of the various parts without departing from the spirit of the invention, and reference is therefore to be had to the appended claims for a definition of the limits of the invention.

What is claimed is:

1. Loading and transporting apparatus comprising a vehicle, a swinging standard mounted on said vehicle and having a running support for a cable, a cable passing over said support, means for hauling in said cable to lift a load to be transported and to swing said standard, a pivoted load support, and operative connections between said standard and said load support to move the latter to load supporting position.

2. Apparatus of the class described comprising a frame having supporting wheels, a swinging standard carried by said frame and having a cable fairlead, a cable passing through said fairlead, a swinging load support carried by said frame and movable to a substantially vertical load supporting position, a swinging bunk pivoted on said load support, and link means joining said swinging standard and load support.

3. Apparatus of the class described comprising a vehicle, a standard pivoted on said vehicle about a horizontal axis, a load support pivoted on said vehicle about a horizontal axis, a connecting link joining said standard and load support, and a cable for attachment to a load to be transported, said cable having a running support on said standard.

4. Apparatus of the class described comprising in combination, a vehicle, a swinging standard mounted on said vehicle and having a cable fairlead, a swinging load support mounted on said vehicle and movable to a substantially vertical load supporting position, a connecting link joining said standard and load support, and a cable drum and cable, said cable passing through said fairlead for attachment to a load to be transported.

5. Apparatus of the class described comprising wheels of the track laying type, a frame supported thereby, a standard pivoted on said frame and having a cable fairlead, a load support pivoted on said frame, link means connecting said standard and load support for simultaneous swinging movement about their pivots, and a cable passing through said fairlead for attachment to a load to be transported, said support swinging to load support position when said cable is hauled in.

6. Apparatus of the class described, comprising a vehicle, a source of power mounted thereon, a load elevating standard pivoted to swing longitudinally of said vehicle from a point to the rear of its pivot to a point forward of the pivot, a load support pivoted on said vehicle independently of said standard and connected to said standard to swing therewith in a vertical plane from a point to the rear of its pivot to a substantially vertical position, and operative connections from said source of power to said standard to swing the same about its pivot from a rearwardly inclined position to its forwardly inclined position, whereby said support is swung to load supporting position when the load is elevated and the load is lowered onto said load support when said standard is swung to its forwardly inclined position.

In testimony whereof I have signed this specification.

ARTHUR HANNA DE ROCHER.